(12) United States Patent (10) Patent No.: US 8,657,103 B2
Herrmann et al. (45) Date of Patent: Feb. 25, 2014

(54) MEDIA TRANSPORT SYSTEM WITH VIBRATORY EDGE REGISTRATION FUNCTION

(75) Inventors: Douglas K. Herrmann, Webster, NY (US); John P. Parsons, Manhattan Beach, CA (US); Robert L. Powell, Lakeville, MN (US)

(73) Assignee: Xerox Corporation, Norwalk, CT (US)

( * ) Notice: Subject to any disclaimer, the term of this patent is extended or adjusted under 35 U.S.C. 154(b) by 409 days.

(21) Appl. No.: 12/794,837

(22) Filed: Jun. 7, 2010

(65) Prior Publication Data
US 2011/0297510 A1 Dec. 8, 2011

(51) Int. Cl.
*B65G 27/04* (2006.01)

(52) U.S. Cl.
USPC ............... 198/752.1; 198/836.1; 198/759

(58) Field of Classification Search
None
See application file for complete search history.

(56) References Cited

U.S. PATENT DOCUMENTS

| | | | |
|---|---|---|---|
| 3,147,851 A * | 9/1964 | Dietrich ............... | 198/703 |
| 3,800,935 A * | 4/1974 | Montgomery ........... | 198/572 |
| 4,344,727 A | 8/1982 | Chaloupka | |
| 5,429,475 A | 7/1995 | Mohr | |
| 5,508,818 A | 4/1996 | Hamma | |
| 5,735,386 A * | 4/1998 | Epp et al. ............ | 198/550.01 |
| 5,927,936 A | 7/1999 | Arikawa et al. | |
| 5,979,640 A * | 11/1999 | Horton ................ | 198/770 |
| 6,032,004 A | 2/2000 | Mirabella, Jr. et al. | |
| 6,055,896 A | 5/2000 | Molison | |
| 6,530,203 B2 * | 3/2003 | Suzuki et al. ......... | 56/327.2 |
| 6,623,000 B2 * | 9/2003 | Hall ................... | 271/11 |
| 6,976,591 B2 * | 12/2005 | Reding ................ | 209/692 |

FOREIGN PATENT DOCUMENTS

GB 769133 2/1957

* cited by examiner

*Primary Examiner* — Kavel Singh
(74) *Attorney, Agent, or Firm* — Gibb & Riley, LLC

(57) ABSTRACT

An apparatus has a continuous loop conveyor belt mounted on a frame. The conveyor belt has a first edge, a second edge, and a belt surface between the first edge and the second edge. The first edge is positioned relatively higher than the second edge such that the belt surface is at an angle with respect to a horizontal ground reference plane, and such that the belt surface slopes downwardly from the first edge toward the second edge. In addition, a sidewall is connected to the frame. The sidewall is positioned adjacent the second edge, and the sidewall is perpendicular to the belt surface and runs parallel to the second edge. Therefore, the sidewall prevents items from falling off the belt surface at the second edge. Further, a plurality of rectangular fins are connected to the belt surface. The fins are perpendicular to the sidewall and perpendicular to the belt surface. A vibrator is connected to the frame and transmits vibrations to the conveyor belt.

20 Claims, 4 Drawing Sheets

MEDIA TRANSPORT SYSTEM WITH VIBRATORY EDGE REGISTRATION FUNCTION

BACKGROUND

Embodiments herein generally relate to conveyor belt systems and more particularly to a system that uses a vibrator to aid in the alignment of stacks of items on a conveyor belt.

Multi-sheet collations, when transported by a pusher belt system, either arrive at the belt unregistered, are added unregistered to a pre-registered set, or become unregistered during transport. Single and multi-sheet collations of different lengths are constrained in the process direction by perpendicular fins called "pushers" but the length differences in the collations do not allow for side to side registration with fixed registration walls. This causes misregistration in those stacks made up of any media with sizes smaller than the registration wall width dimensions. When tabs are present on the sheets—any actuated tamping impacts the stack in the cross process direction having the undesired effect of bending the tabs during the tamp operation.

SUMMARY

The embodiments herein incorporate a vibratory unit that excites the media transport to induce a registration action. By incorporating active vibration with an angled media transport, a single sheet or stack of media can be edge registered to a registration wall without the need for a contact tamping force. This vibratory energy imparted to the transport allows different size/width sheets to be registered within the same transport.

The embodiments herein can be used in conjunction with a pusher type transport and provide continued registration for the entire length of the transport without the need for separate actuators for each pocket. The vibration energy eliminates the need to adjust for different width stacks over the length of a transport when stacks of different widths are alternately stacked.

Disclosed herein is an apparatus that has a continuous loop conveyor belt mounted on a frame. The conveyor belt has a first edge, a second edge, and a belt surface between the first edge and the second edge. The first edge is positioned relatively higher than the second edge such that the belt is at an angle with respect to a horizontal ground reference plane, and such that the belt slopes downwardly from the first edge toward the second edge.

In addition, a sidewall is connected to the frame. The sidewall is positioned adjacent the second edge, and the sidewall is perpendicular to the belt surface and runs parallel to the second edge. Therefore, the sidewall prevents items from falling off the belt surface at the second edge.

Further, rectangular fins are connected to the belt surface. The fins are perpendicular to the sidewall and perpendicular to the belt surface. The rectangular fins are thin rectangles. Therefore, the fins have a height dimension that is greater than their width dimension, and a length dimension greater than the height dimension. The length dimension is the surface of the fins that is perpendicular to the flat surface of the sidewall. The rectangular fins define pockets along the conveyor belt, and the pockets maintain stacks of items.

A vibrator is connected to the frame and transmits vibrations to the conveyor belt. The vibrations transmitted by the vibrator to the conveyor belt align the stacks of items within the pockets against the sidewall.

In some embodiments, the conveyor belt moves and the sidewall is stationary such that the conveyor belt moves by the sidewall. The rectangular fins also form a corner with the sidewall, and the corner maintains items stacked on the conveyor belt. The sidewall has a flat surface that has a coefficient of friction less than the coefficient of friction of the belt surface, so the items on the belt slide along the sidewall and do not slide along the belt. However, the coefficient of friction can be controlled to force the items into the corner created by the fins and the sidewall.

In some embodiments, a motor drives the conveyor belt, and a controller is operatively connected to the vibrator and the motor. The controller cycles the motor through on and off states to allow items to be placed and stacked on the belt. To help move items on the conveyer belt toward the sidewall, the controller turns the vibrator on a predetermined time period before the controller turns the motor on, yet the controller turns the vibrator off a predetermined time period before the controller turns the motor off, to prevent items that have aligned themselves on the sidewall from becoming dislodged from the stack.

In additional embodiments, the frame has a first connection point (e.g., roller) connected to one end of the conveyor belt and a second connection point connected to a second end of the conveyor belt. The first connection point is positioned relatively higher than the second connection point such that the belt surface is at an angle with respect to the horizontal ground reference plane and such that the belt surface slopes downwardly from the first connection point toward the second connection point.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

A common problem encountered with pusher type transports is misregistration of the media stack. This misregistration is caused by three main problems. One problem is that the set is placed onto the transport in an unregistered state. Another problem is that, as sheets are added to the set, the set becomes unregistered. Also, during the transport of the set, the sets can become unregistered.

By adding an exciting force and predetermined tilt angle to the media conveyor it is possible to not only register sheets as the stack is being formed but also to provide continuous registration along the entire conveyor to ensure registration of the sheets even during the transport operation. Because no outside tamping contact force is required, the width of the media and the shape of the media do not affect the ability of the system to register the stack.

With the need to stack different width cards/sheets, the vibratory registration action imparted to the transport continues to register the stacks without a need to account for the stack widths. This is useful when stacks of different widths are stacked side by side in the pusher transport. Further, the use of a variable frequency/amplitude input type design allows for the vibratory motion to be optimized for a particular media and/or system motion profile.

As is common in transports, this system involves a high acceleration in the process direction which causes shingling and scattering of the cards within the sets. When not actively registered, the cards remain shingled and scattered and cause failures in the down stream transport and shrink wrap operations.

Figure 1:
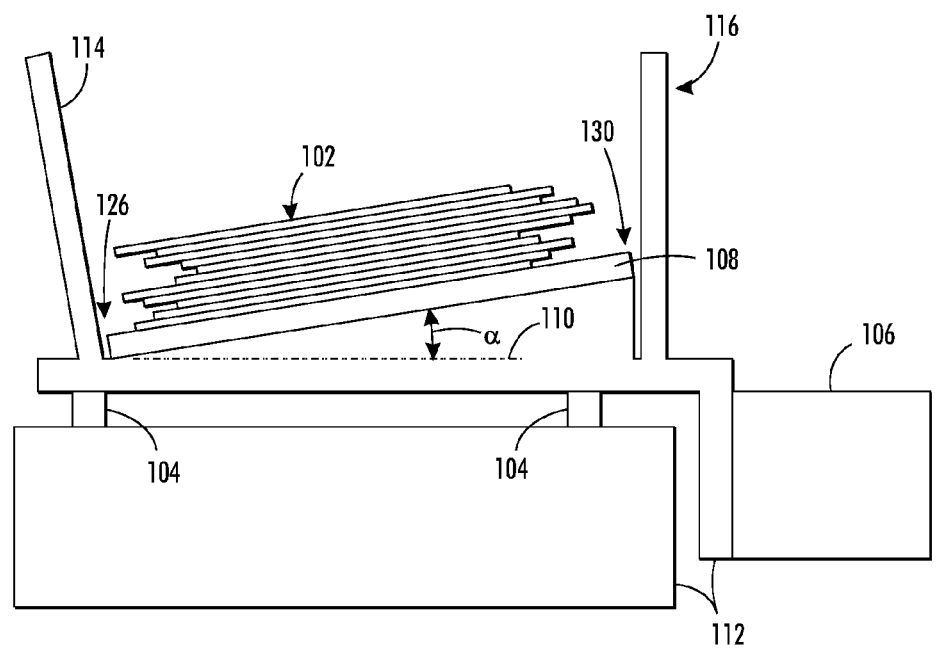
FIG. 1 is a cross-sectional view schematic diagram of a conveyor apparatus according to embodiments herein.
Figure 3:
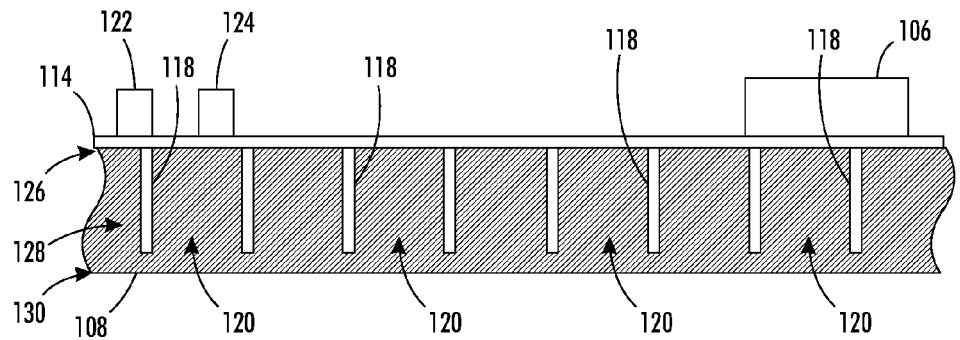
FIG. 3 is a top view schematic diagram of a conveyor apparatus according to embodiments herein.

More specifically, as shown in cross-sectional view in FIG. 1 and in top-view in FIG. 3, one exemplary apparatus embodiment includes a continuous loop conveyor belt 108 mounted on a frame 112 using shock absorbing (e.g., rubber) mounts 104. The conveyor belt 108 has a first edge 130, a second edge 126, and a belt surface 128 between the first edge 130 and the second edge 126. The conveyor belt 108 moves in a processing direction and the edges 126, 130 are parallel to this processing direction.

As shown in FIG. 1, the first edge 130 is positioned relatively higher than the second edge 126 such that the conveyor belt 108 is at an angle ($\alpha$) with respect to a horizontal ground reference plane 110, and such that the belt conveyor belt 108 slopes downwardly from the first edge 130 toward the second edge 126. More specifically, the ground reference plane 110 represents the surface of the earth, which is a surface toward which gravity acts in a perpendicular direction. Therefore, items stacked on the conveyor belt 108 will have the tendency to move toward the second edge 126, because of the forces of gravity.

In addition, sidewalls 114, 116 are connected to the frame 112. One sidewall 114 is positioned adjacent the second edge 126, and this sidewall 114 is at a right angle to the conveyor belt 108 (is perpendicular to the belt surface 128 and runs parallel to the second edge 126). Therefore, the sidewall 114 prevents items 102 from falling off the belt surface 128 at the second edge 126 and promotes the registration or alignment of the items 102 by providing a flat surface that the items 102 can all rest against.

Further, rectangular fins 118 (sometimes called "pushers") are connected to the belt surface 128. The fins 118 are perpendicular to the sidewall 114 and perpendicular to the belt surface 128. The rectangular fins 118 are thin rectangles. Therefore, the fins 118 have a height dimension that is greater than their width dimension, and a length dimension greater than the height dimension. The length dimension is the surface of the fins 118 that is perpendicular to the flat surface of the sidewall 114. The rectangular fins 118 define pockets 120 along the conveyor belt 108, and the pockets 120 maintain stacks of items 102.

Figure 2:
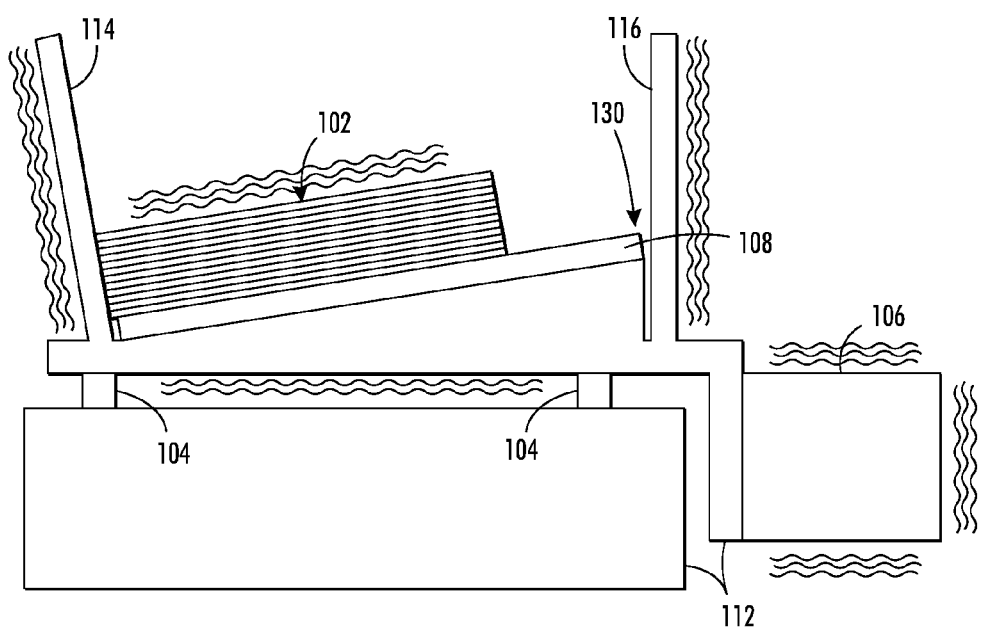
FIG. 2 is a cross-sectional view schematic diagram of a conveyor apparatus according to embodiments herein.

A vibrator 106 is connected to the frame 112 and, as shown by the vibration lines in FIG. 2, transmits vibrations to the conveyor belt 108 and to the items 102 on the conveyor belt 108. The vibrations transmitted by the vibrator 106 to the conveyor belt 108 help align the stacks of items 102 within the pockets 120 against the sidewall 114.

Figure 5:
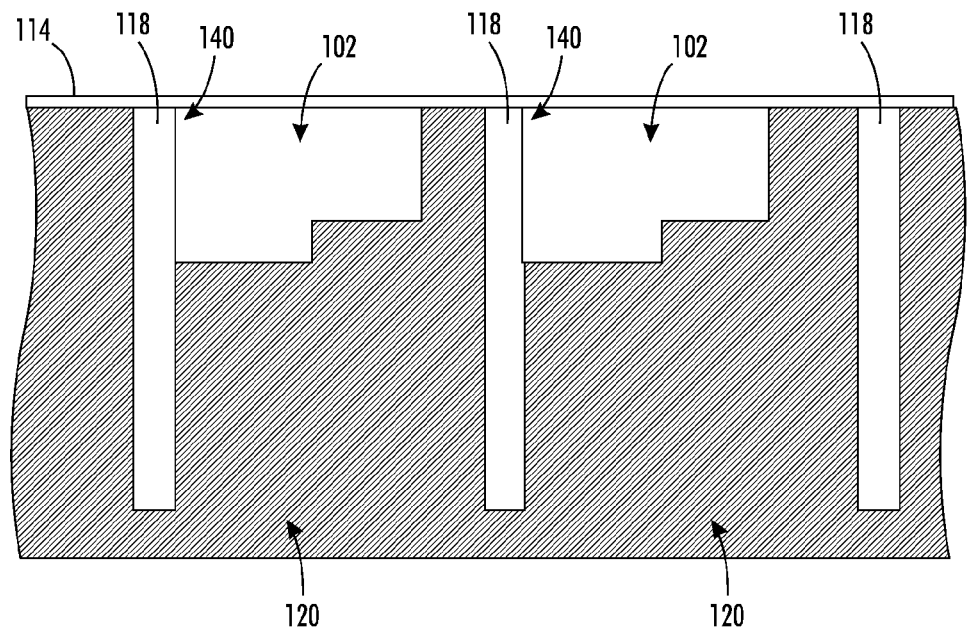
FIG. 5 is a top view schematic diagram of a conveyor apparatus according to embodiments herein.
Figure 6:
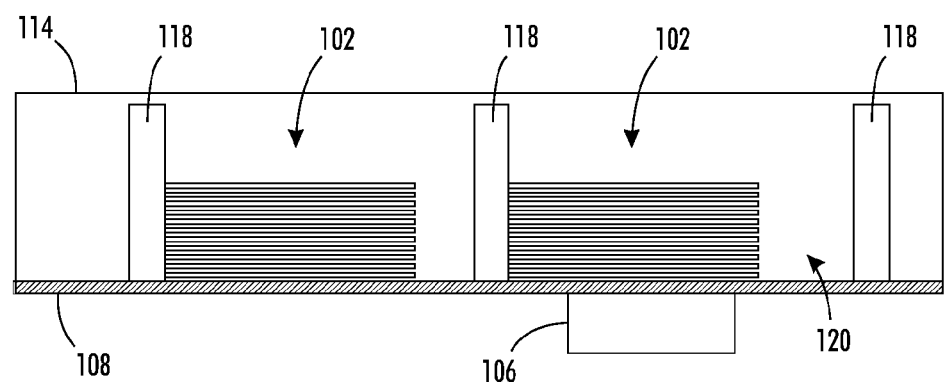
FIG. 6 is a cross-sectional view schematic diagram of a conveyor apparatus according to embodiments herein.

Therefore, as shown in FIGS. 2, 5 and 6, items 102 that may only include two adjacent flat sides can be aligned by embodiments herein without the use of tamping or other alignment structures that could damage tabbed items 102.

Figure 4:
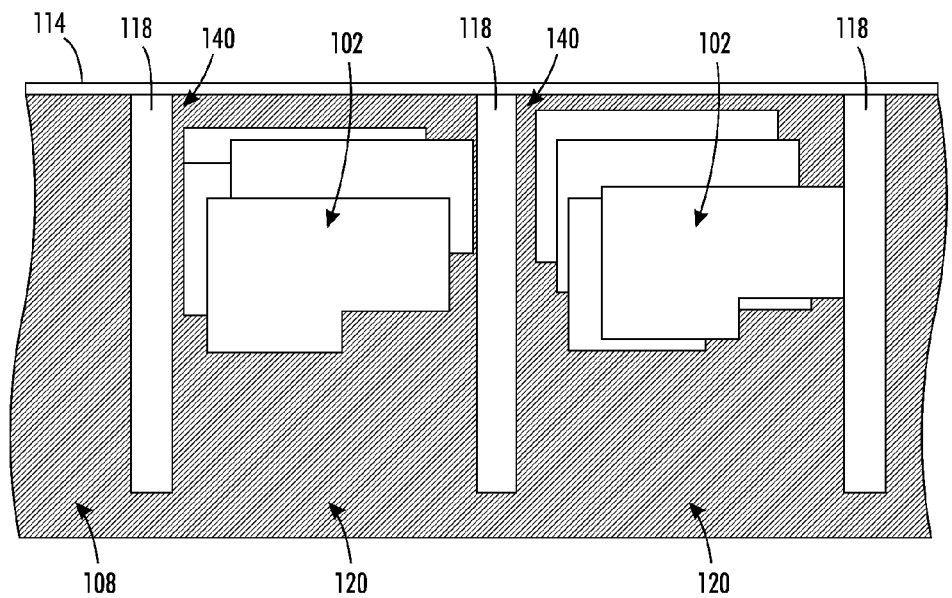
FIG. 4 is a top view schematic diagram of a conveyor apparatus according to embodiments herein.

The rectangular fins 118 also form a corner 140 with the sidewall 114, and the corner 140 maintains items 102 stacked on the conveyor belt 108. In some embodiments, the conveyor belt 108 moves and the sidewall 114 is stationary such that the conveyor belt 108 moves by the sidewall 114. The sidewall 114 has a flat surface that has a coefficient of friction less than the coefficient of friction of the belt surface 128, so the items 102 on the belt 108 slide along the sidewall 114 and do not slide along the belt 108. However, the coefficient of friction can be controlled to force the items 102 into the corner 140 created by the fins 118 and the sidewall 114, as shown in FIG. 5. Therefore, while the items 102 may initially be placed within the pockets 120 in somewhat disorganized stacks (as shown in FIG. 4, which is a magnified top-view); through the operation of the vibrator 106, the angled conveyor belt 108, and the friction of the sidewall 114, the items 102 can be aligned into registered stacks that are positioned against the corner 140, as shown in FIGS. 5 and 6.

Alternatively, the sidewall 114 can be formed as part of the conveyor belt 108 and can move with the conveyor belt 108. In embodiments that utilize this structure, the acceleration forces that occur when the conveyor belt 108 is started (or stopped) move the items 102 toward the fin 118. This movement in coordination with the vibrations produced by the vibrator 106 (and the gravitational forces exerted by the angled conveyor belt 108) cause the items 102 to be properly aligned within the corner 140, as shown in FIGS. 5 and 6.

As shown in FIG. 3, a motor 122 drives the conveyor belt 108, and a controller 124 is operatively connected to the vibrator 106 and the motor 122. The controller 124 includes a processor and memory (a computer readable storage medium). The memory stores instructions that the processor executes to perform the various functions described herein.

In some installations, the controller 124 cycles the motor 122 through on and off states to allow items 102 to be placed and stacked on the belt 108. For example, the belt 108 may pause periodically to allow each pocket 120 to remain positioned in front of a printing or finishing device that outputs the items 102. Therefore, the conveyor belt 108 could pause a sufficient time to allow a specific number of items 102 to be placed within each of the pockets 120.

Figure 7:
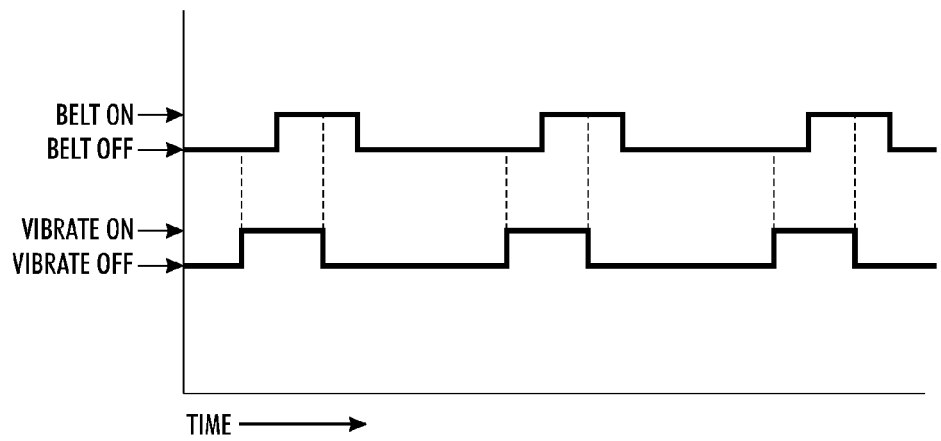
FIG. 7 is a chart illustrating the vibration operation of a conveyor apparatus according to embodiments herein.

The embodiments herein take advantage of this on/off cycling to help move items 102 on the conveyer belt 108 toward the fins 118 by ensuring that the vibrator 106 is on when the conveyor belt begins to move. This takes advantage of the acceleration forces that the items 102 experience when the conveyor belt 108 begins to move. With the vibrator 106 being on while the acceleration forces affect the items 102, the items move toward the fins 118 more readily than they would without the vibrations. In addition, these embodiments turn the vibrator 106 off before the conveyor belt 108 is stopped to decrease of the tendency of deceleration forces to move the items 102 in the opposite direction away from the fins 118. This is shown in FIG. 7 where the timing of the conveyor belt 108 being on or off is graphed against the timing of vibrator 106 being on or off over time. As shown in FIG. 7, the vibrator is turned on before the belt is turned on and the vibrator is turned off before the belt is turned off (or vice versa, depending upon implementation).

More specifically, in this embodiment, the controller 124 turns the vibrator 106 on a predetermined time period before the controller 124 turns the motor 122 on, to help align the items 102 against the fins 118. Also, the controller 124 turns the vibrator 106 off a predetermined time period before the controller 124 turns the motor 122 off, to prevent items 102 that have aligned themselves against the fins 118 from becoming dislodged by deceleration forces.

Figure 8:
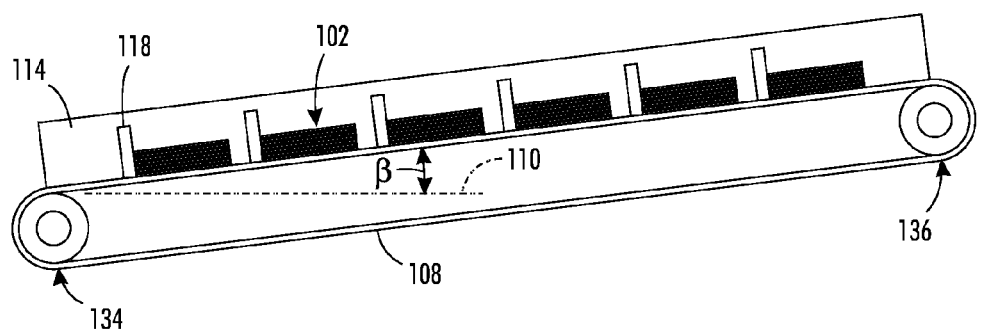
FIG. 8 is a cross-sectional view schematic diagram of a conveyor apparatus according to embodiments herein.

In an additional embodiment shown in FIG. 8, the frame 112 has a first connection point 136 (e.g., roller) connected to one end of the conveyor belt 108 and a second connection point 134 connected to a second end of the conveyor belt 108. The convertor belt 108 continuously loops around the connection points 134, 136. The first connection point 136 is positioned relatively higher than the second connection point 134 such that the belt surface 128 is at an angle ($\beta$) with respect to the horizontal ground reference plane 110, and such that the belt surface 128 slopes downwardly from the first connection point 136 toward the second connection point 134 (or vice versa, depending upon implementation). In this embodiment, the angle of the conveyor belt 108 toward the sidewall 114 and toward the fins 118, in combination with the vibrations produced by the vibrator 106, allow the items 402 to be aligned in the corner 140 and to remain in such an alignment without requiring tampers or other mechanisms that could damage the items 102.

With embodiments herein, the integration of vibratory unit with pusher belt transport technology provides continuous registration during transport of different width media. The use of an adjustable vibratory unit along with an angled transport provides continuous side edge registration. Thus, the embodiments herein are systems that provide continuous registration along the entire transport, without the need to contact all edges of media. This provides the ability to register multiple width cards/sheets and allows registration without contact, eliminating the need to identify card size and eliminating contact damage (such as tab damage). Thus, the embodiments herein eliminate the need to provide tampers for each pocket along transport path and have the ability to optimize systems easily for differences in media size, shape, properties and environment changes. Also, with embodiments, there is no need to finely adjust tamping type motion to ensure proper registration Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known by those ordinarily skilled in the art and are discussed in, for example, U.S. Pat. No. 6,032,004, the complete disclosure of which is fully incorporated herein by reference. The embodiments herein can encompass embodiments that print in color, monochrome, or handle color or monochrome image data. All foregoing embodiments are specifically applicable to electrostatographic and/or xerographic machines and/or processes.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the embodiments herein cannot be implied or imported from any above example as limitations to any particular order, number, position, size, shape, angle, color, or material.

What is claimed is:

1. An apparatus comprising:
   a frame;
   a continuous loop conveyor belt mounted on said frame, said conveyor belt having a first edge, a second edge, and a belt surface between said first edge and said second edge, said belt surface moving in a direction parallel to said first edge and said second edge, said first edge being positioned relatively higher than said second edge such that said conveyor belt is at an angle with respect to a horizontal ground reference plane and such that said conveyor belt slopes downwardly from said first edge toward said second edge;
   a sidewall connected to said frame, said sidewall being positioned adjacent said second edge, said sidewall being perpendicular to said belt surface and running parallel to said second edge along an entire length of said belt surface in said direction, said sidewall forming a right angle with said belt surface to prevent items from falling off said belt surface at said second edge;
   a plurality of rectangular fins connected to said belt surface, said fins being perpendicular to said sidewall and being perpendicular to said belt surface; and
   a vibrator connected to said frame, said vibrator producing and transmitting vibrations to said conveyor belt.

2. The apparatus according to claim 1, said sidewall having a flat surface, said flat surface having a coefficient of friction less than a coefficient of friction of said belt surface.

3. The apparatus according to claim 2, said rectangular fins having a height dimension greater than a width dimension, and a length dimension greater than said height dimension, said length dimension being perpendicular to said flat surface of said sidewall.

4. The apparatus according to claim 1, said rectangular fins forming a corner with said sidewall, said corner maintaining items stacked on said conveyor belt.

5. The apparatus according to claim 1, said rectangular fins defining pockets along said conveyor belt, said pockets maintaining stacks of items.

6. The apparatus according to claim 5, said vibrations transmitted by said vibrator to said conveyor belt aligning said stacks of items within said pockets against said sidewall.

7. The apparatus according to claim 1, said conveyor belt moving and said sidewall being stationary such that said conveyor belt moves by said sidewall.

8. An apparatus comprising:
   a frame;
   a continuous loop conveyor belt mounted on said frame, an upper surface of said conveyor belt having a first edge, a second edge, and a belt surface between said first edge and said second edge, said belt surface moving in a direction parallel to said first edge and said second edge, said first edge being positioned relatively higher than said second edge such that said conveyor belt is at an angle with respect to a horizontal ground reference plane and such that said conveyor belt slopes downwardly from said first edge toward said second edge;

a sidewall connected to said frame, said sidewall being positioned adjacent said second edge, said sidewall being perpendicular to said belt surface and running parallel to said second edge along an entire length of said belt surface in said direction, said sidewall forming a right angle with said belt surface to prevent items from falling off said belt surface at said second edge;

a plurality of rectangular fins connected to said belt surface, said fins being perpendicular to said sidewall and being perpendicular to said belt surface;

a vibrator connected to said frame, said vibrator producing and transmitting vibrations to said conveyor belt;

a motor driving said conveyor belt; and a controller operatively connected to said vibrator and said motor, said controller cycling said motor through on and off states, said controller turning said vibrator on a predetermined time period before said controller turns said motor on, and said controller turning said vibrator off a predetermined time period before said controller turns said motor off.

9. The apparatus according to claim 8, said sidewall having a flat surface, said flat surface having a coefficient of friction less than a coefficient of friction of said belt surface.

10. The apparatus according to claim 9, said rectangular fins having a height dimension greater than a width dimension, and a length dimension greater than said height dimension, said length dimension being perpendicular to said flat surface of said sidewall.

11. The apparatus according to claim 8, said rectangular fins forming a corner with said sidewall, said corner maintaining items stacked on said conveyor belt.

12. The apparatus according to claim 8, said rectangular fins defining pockets along said conveyor belt, said pockets maintaining stacks of items.

13. The apparatus according to claim 12, said vibrations transmitted by said vibrator to said conveyor belt aligning said stacks of items within said pockets against said sidewall.

14. The apparatus according to claim 8, said conveyor belt moving and said sidewall being stationary such that said conveyor belt moves by said sidewall.

15. An apparatus comprising:

a frame;

a continuous loop conveyor belt mounted on said frame, an upper surface of said conveyor belt having a first edge, a second edge, and a belt surface between said first edge and said second edge, said belt surface moving in a direction parallel to said first edge and said second edge, said first edge being positioned relatively higher than said second edge such that said conveyor belt is at an angle with respect to a horizontal ground reference plane and such that said conveyor belt slopes downwardly from said first edge toward said second edge;

a sidewall connected to said frame, said sidewall being positioned adjacent said second edge, said sidewall being perpendicular to said belt surface and running parallel to said second edge along an entire length of said belt surface in said direction, said sidewall forming a right angle with said belt surface to prevent items from falling off said belt surface at said second edge;

a plurality of rectangular fins connected to said belt surface, said fins being perpendicular to said sidewall and being perpendicular to said belt surface;

a vibrator connected to said frame, said vibrator producing and transmitting vibrations to said conveyor belt;

a motor driving said conveyor belt; and a controller operatively connected to said vibrator and said motor, said controller cycling said motor through on and off states, said controller turning said vibrator on a predetermined time period before said controller turns said motor on, said controller turning said vibrator off a predetermined time period before said controller turns said motor off, said frame comprising a first connection point connected to one end of said conveyor belt and a second connection point connected to a second end of said conveyor belt, said first connection point being positioned relatively higher than said second connection point such that said conveyor belt is at an angle with respect to said horizontal ground reference plane and such that said conveyor belt slopes downwardly from said first connection point toward said second connection point.

16. The apparatus according to claim 15, said sidewall having a flat surface, said flat surface having a coefficient of friction less than a coefficient of friction of said belt surface.

17. The apparatus according to claim 16, said rectangular fins having a height dimension greater than a width dimension, and a length dimension greater than said height dimension, said length dimension being perpendicular to said flat surface of said sidewall.

18. The apparatus according to claim 15, said rectangular fins forming a corner with said sidewall, said corner maintaining items stacked on said conveyor belt.

19. The apparatus according to claim 15, said rectangular fins defining pockets along said conveyor belt, said pockets maintaining stacks of items.

20. The apparatus according to claim 19, said vibrations transmitted by said vibrator to said conveyor belt aligning said stacks of items within said pockets against said sidewall.

* * * * *